US009383959B2

(12) United States Patent
Wada et al.

(10) Patent No.: US 9,383,959 B2
(45) Date of Patent: Jul. 5, 2016

(54) ROTATABLE MOBILE ELECTRONIC DEVICE AND SOFT KEY INPUT METHOD

(75) Inventors: Yuuki Wada, Kanagawa (JP); Tsuneo Miyashita, Kanagawa (JP)

(73) Assignee: KYOCERA CORPORATION, Kyoto (JP)

(*) Notice: Subject to any disclaimer, the term of this patent is extended or adjusted under 35 U.S.C. 154(b) by 281 days.

(21) Appl. No.: 13/481,409

(22) Filed: May 25, 2012

(65) Prior Publication Data

US 2012/0299954 A1    Nov. 29, 2012

(30) Foreign Application Priority Data

May 27, 2011 (JP) ................... 2011-119525
May 25, 2012 (JP) ................... 2012-120272

(51) Int. Cl.
G09G 5/22       (2006.01)
G06F 3/14       (2006.01)
G09G 5/14       (2006.01)

(52) U.S. Cl.
CPC ............... *G06F 3/1423* (2013.01); *G09G 5/14* (2013.01); *G09G 2340/0492* (2013.01); *G09G 2370/24* (2013.01)

(58) Field of Classification Search
None
See application file for complete search history.

(56) References Cited

U.S. PATENT DOCUMENTS

| | | | |
|---|---|---|---|
| 5,467,392 A | 11/1995 | Norimatsu | |
| 6,564,213 B1 | 5/2003 | Ortega et al. | |
| 6,868,145 B1 | 3/2005 | Nelson | |
| 8,723,802 B2 | 5/2014 | Watanabe et al. | |
| 2003/0203747 A1 | 10/2003 | Nagamine | |
| 2004/0021681 A1* | 2/2004 | Liao ..................... | 345/702 |
| 2005/0129199 A1 | 6/2005 | Abe | |
| 2006/0129949 A1 | 6/2006 | Wu | |
| 2007/0189717 A1 | 8/2007 | Yun et al. | |
| 2007/0287479 A1 | 12/2007 | Kim | |
| 2008/0172609 A1 | 7/2008 | Rytivaara | |
| 2008/0174564 A1 | 7/2008 | Kim et al. | |

(Continued)

FOREIGN PATENT DOCUMENTS

| | | |
|---|---|---|
| JP | 2007-200243 A | 8/2007 |
| JP | 2009-32209 A | 2/2009 |
| JP | 2010-33429 A | 2/2010 |
| WO | 2009/017175 A1 | 2/2009 |
| WO | 2010/110613 A1 | 9/2010 |

OTHER PUBLICATIONS

Non-Final Office Action issued to U.S. Appl. No. 13/481,304 (mailed Feb. 14, 2014).

(Continued)

*Primary Examiner* — Barry Drennan
*Assistant Examiner* — Diana Hickey
(74) *Attorney, Agent, or Firm* — Hauptman Ham, LLP

(57) ABSTRACT

An object is to provide a mobile electronic device and an input method that can display soft keys corresponding to each of the characters of different character kinds appropriately even in a state where the display screen of the display unit is used horizontally. In a state where the display screen is used vertically, the control unit splits the display screen into upper and lower sides and displays the plurality of soft keys in the display screen uniformly. In a state where the display screen is used horizontally, the control unit splits the display screen into right and left sides, and displays the first character kind character on one side, and displays the second character kind character on the other side, and displays a plurality of soft keys on either one of the one side or the other side in a right-left direction.

12 Claims, 12 Drawing Sheets

(56) References Cited

U.S. PATENT DOCUMENTS

| | | |
|---|---|---|
| 2009/0288036 A1 | 11/2009 | Osawa et al. |
| 2010/0035658 A1 | 2/2010 | Lee |
| 2010/0066751 A1* | 3/2010 | Ryu et al. ................... 345/581 |
| 2010/0081475 A1* | 4/2010 | Chiang et al. ............... 455/564 |
| 2010/0214278 A1 | 8/2010 | Miura |
| 2010/0223547 A1 | 9/2010 | Wilson et al. |
| 2010/0248788 A1 | 9/2010 | Yook et al. |
| 2010/0304791 A1* | 12/2010 | Lee et al. ................... 455/566 |
| 2011/0175818 A1 | 7/2011 | Watanabe et al. |

OTHER PUBLICATIONS

Office Action Issued to U.S. Appl. No. 13/481,304, mailed Mar. 23, 2015.

Office Action mailed Sep. 23, 2015, corresponding to U.S. Appl. No. 13/481,304.

Office Action mailed Sep. 29, 2015, corresponding to Japanese Patent Application No. 2012-120211, for which an explanation of relevance is attached.

* cited by examiner (a)

| KEY POSITION INFORMATION | KEY ASSIGNING |
|---|---|
| ⋮ | ⋮ |
| X2, Y1 | 1 |
| X2, Y2 | 2 |
| X2, Y3 | 3 |
| X3, Y1 | 4 |
| X3, Y2 | 5 |
| X3, Y3 | 6 |
| ⋮ | ⋮ |

(b)

| KEY POSITION INFORMATION | NUMBER OF TIMES CONTINUOUSLY PRESSED | KEY ASSIGNING |
|---|---|---|
| ⋮ | | ⋮ |
| X2, Y2 | 1 | a |
| | 2 | b |
| | 3 | c |
| | 4 | A |
| | 5 | B |
| | | ⋮ |

(c)

| KEY POSITION INFORMATION | KEY ASSIGNING |
|---|---|
| ⋮ | ⋮ |
| X2, Y1 | 1ch |
| X2, Y2 | 2ch |
| X2, Y3 | 3ch |
| X3, Y1 | 4ch |
| X3, Y2 | 5ch |
| X3, Y3 | 6ch |
| ⋮ | ⋮ |

(d)

ROTATABLE MOBILE ELECTRONIC DEVICE AND SOFT KEY INPUT METHOD

This application is based on and claims the benefit of priority from Japanese Patent Application Nos. 2011-119525 and 2012-120272, respectively filed on 27 May 2011 and filed on 25 May 2012, the content of which is incorporated herein by reference.

BACKGROUND OF THE INVENTION

1. Field of the Invention

The present invention relates to a mobile electronic device having a display unit, and an input method thereof.

2. Related Art

In a conventional electronic device having a display unit and an operation unit, when an operation unit is operated in a state where a standby screen is displayed on the display unit, characters of different character kinds assigned to the operation unit are input into the electronic device and displayed in different regions in the display unit. Moreover, the electronic device launches a selected application in a state where the displayed characters are inputted by selecting a desired application from a menu for a plurality of applications in a state where inputted characters are displayed on the display unit (for example, refer to JP2007-200243A and JP2009-032209A).

SUMMARY OF THE INVENTION

However, the electronic devices described in JP2007-200243A and JP2009-032209A display characters of different character kinds on the display screen of the display unit by splitting the display screen into two at upper and lower sides or right and left sides. For example, in the electronic devices described in JP2007-200243A and JP2009-032209A, in a state in which the display screen of the display unit is used horizontally, characters of different character kinds are displayed on the display screen of the display unit by splitting the display screen into two at right and left sides.

In such a case, it is difficult for the user to determine which of the different character kinds of characters, that are inputted into two split screens at right and left, the soft key corresponding to each of the characters of different character kinds corresponds to, and thus operativity may be spoiled.

An object of the present invention is to provide a mobile electronic device that can display appropriately soft keys corresponding to each of characters of different character kinds even if the display screen of the display unit is used horizontally.

In order to solve the above problems, the mobile electronic device according to the present invention includes: a display unit having a display screen of a substantially rectangular shape; an operation unit having a plurality of operation keys to which at least a first character kind character and a second character kind character are assigned; and a control unit which, when one operation key is operated among the plurality of the operation keys, displays on the display screen the first character kind character and the second character kind character assigned to the operation key thus operated; in which in a state where the display screen is used vertically, the control unit splits the display screen into upper and lower sides, and displays on the display screen a plurality of soft keys in a right-left direction, and in a state where the display screen is used horizontally, the control unit splits the display screen into right and left sides, and displays a first character kind character on one side of the right and left display screen, displays a second character kind character on the other side, and displays the plurality of soft keys on the one side or the other side of the display screen in a right-left direction.

In addition, it is preferable if the control unit displays in a right-left direction the plurality of soft keys that relate to a function that uses the second character kind character on the other side of the display screen where the second character kind character is displayed.

In addition, it is preferable if, in a state where the first character kind character is displayed on the one side of the display screen, and the second character kind character is displayed on the other side of the display screen and the plurality of soft keys that relate to a function that uses the second character kind character is displayed on the other side of the display screen, the control unit deletes the display of the first character kind character from the one side of the display screen when any one of the plurality of soft keys is operated.

In addition, it is preferable if the operation unit includes a switching key for switching, in a state where the display screen is used horizontally, either one of the one side or the other side of the display screen to an enabled state where an operation by the plurality of soft keys is enabled.

In addition, it is preferable if the control unit displays the plurality of soft keys on the one side or the other side of the display screen that is switched to the enabled state, which is active, by the switching key, uniformly in a right-left direction.

In addition, it is preferable if the mobile electronic device further includes: a first case having the display unit; a second case having the operation unit; and a connecting part which interconnects the first case and the second case and can transfer the display screen into a state used vertically or a state used horizontally.

In order to solve the above problems, the mobile electronic device according to the present invention includes: a display unit having a display screen of a substantially rectangular shape; an operation unit having a plurality of operation keys where at least a first character kind character and a second character kind character are assigned; and a control unit for displaying on the display screen, when one operation key is operated among the plurality of operation keys, the first character kind character and the second character kind character assigned to the operated operation key; in which in a state where the display screen is used vertically, the control unit splits the display screen into upper and lower sides and displays a plurality of soft keys on the display screen uniformly in a right-left direction, and in a state where the display screen is used horizontally, the control unit splits the display screen into right and left sides, and displays the first character kind character on one side of the right and left sides, displays the second character kind on the other side, and displays the plurality of soft keys in a right-left direction in a region extending to both the one side and the other side.

In order to solve the above problems, the input method according to the present invention includes: a step of displaying, when one operation key is operated among a plurality of operation keys of the operation unit, a first character kind character and a second character kind character assigned to the operation key thus operated on a display screen of the display unit; a step of displaying, in a state where the display screen is used vertically, a plurality of soft keys on the display screen in a right-left direction by splitting the display screen into upper and lower sides; and a step of displaying, in a state where the display screen is used horizontally, the first character kind character on one side of right and left sides and the second character kind character on the other side of right and left sides, and the plurality of soft keys on the one side or the other side in a right-left direction by splitting the display screen into right and left sides.

In accordance with the present invention, there are provided a mobile electronic device and an input method thereof, which can display appropriately the soft key corresponding to each character of different character kinds even in a state where the display screen of the display unit is used horizontally.

DETAILED DESCRIPTION OF THE INVENTION

Figure 1:
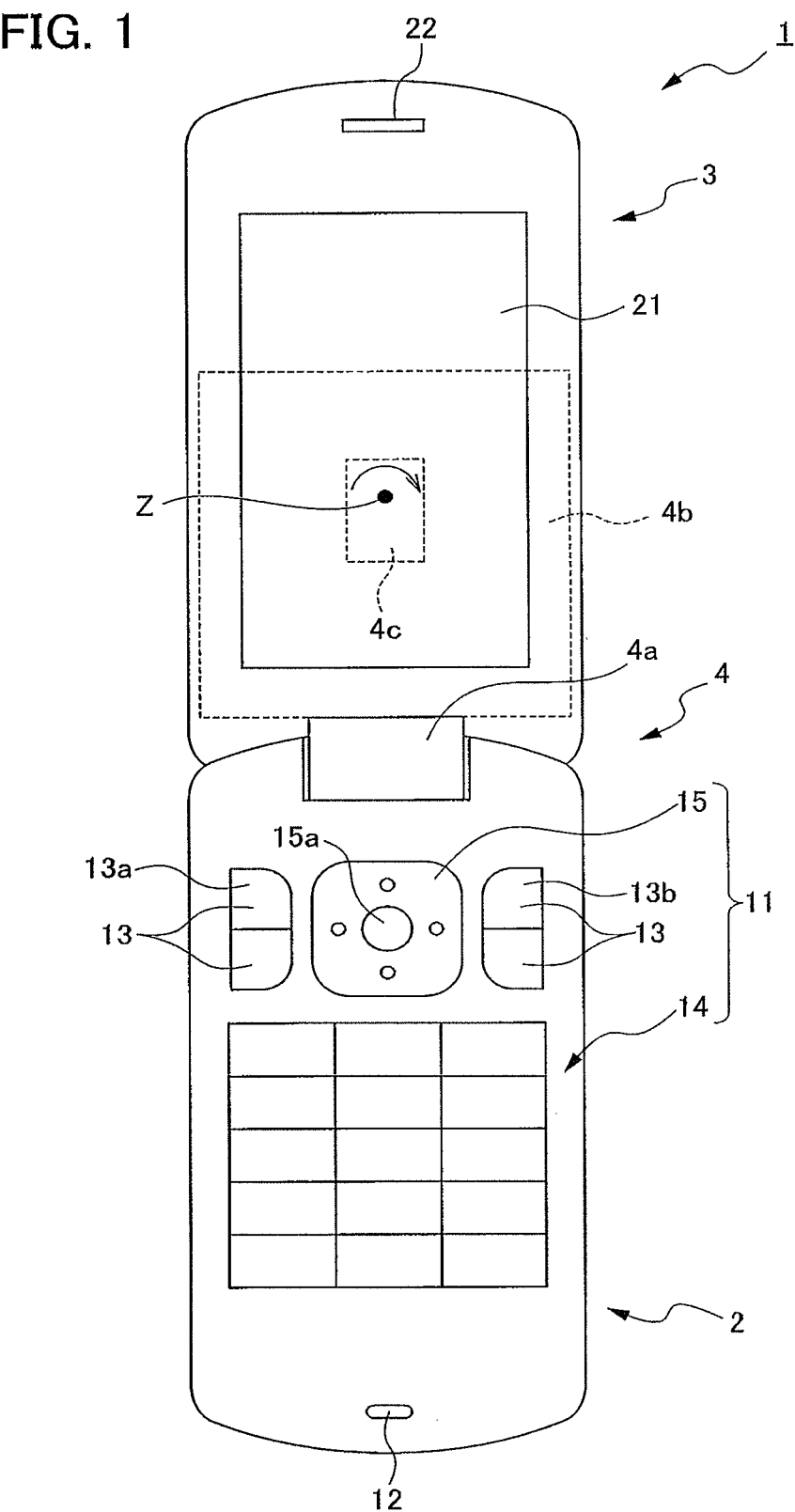
FIG. 1 is a front view of the cellular telephone device in an open state.
Figure 2:
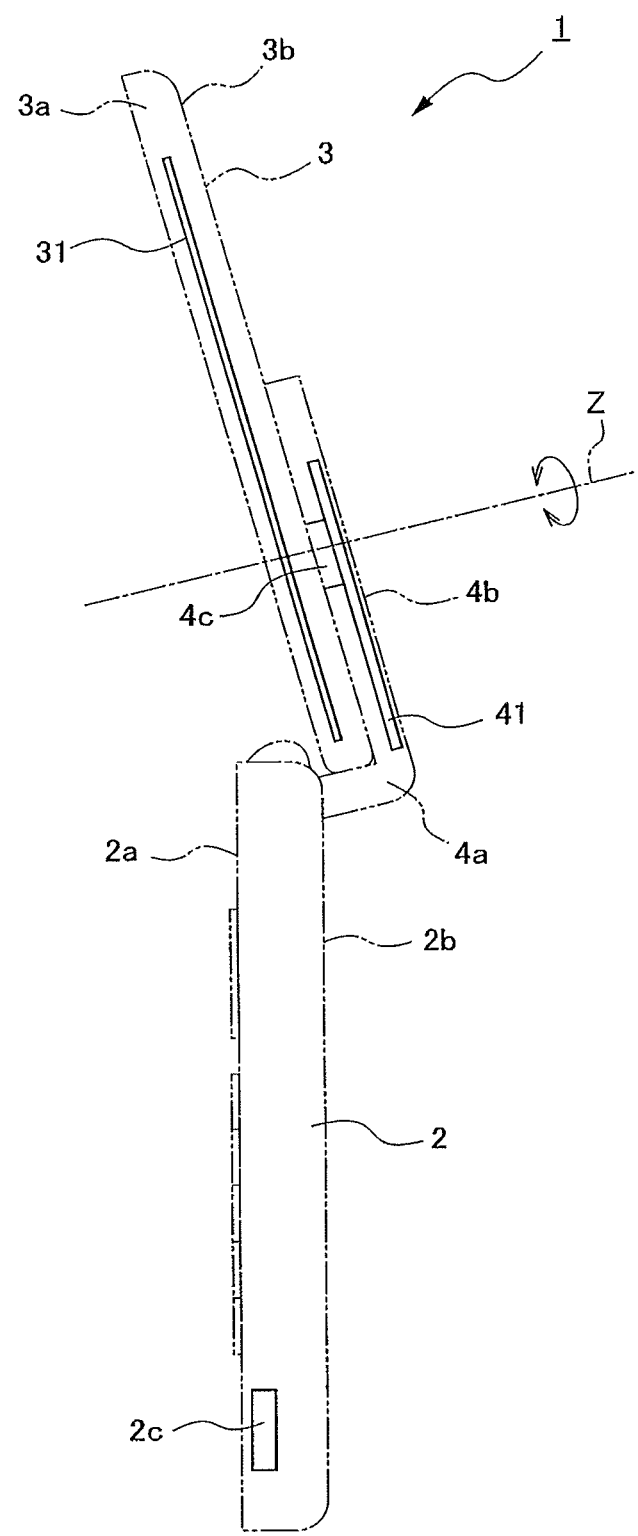
FIG. 2 is a side view of the cellular telephone device in an open state.
Figure 3:
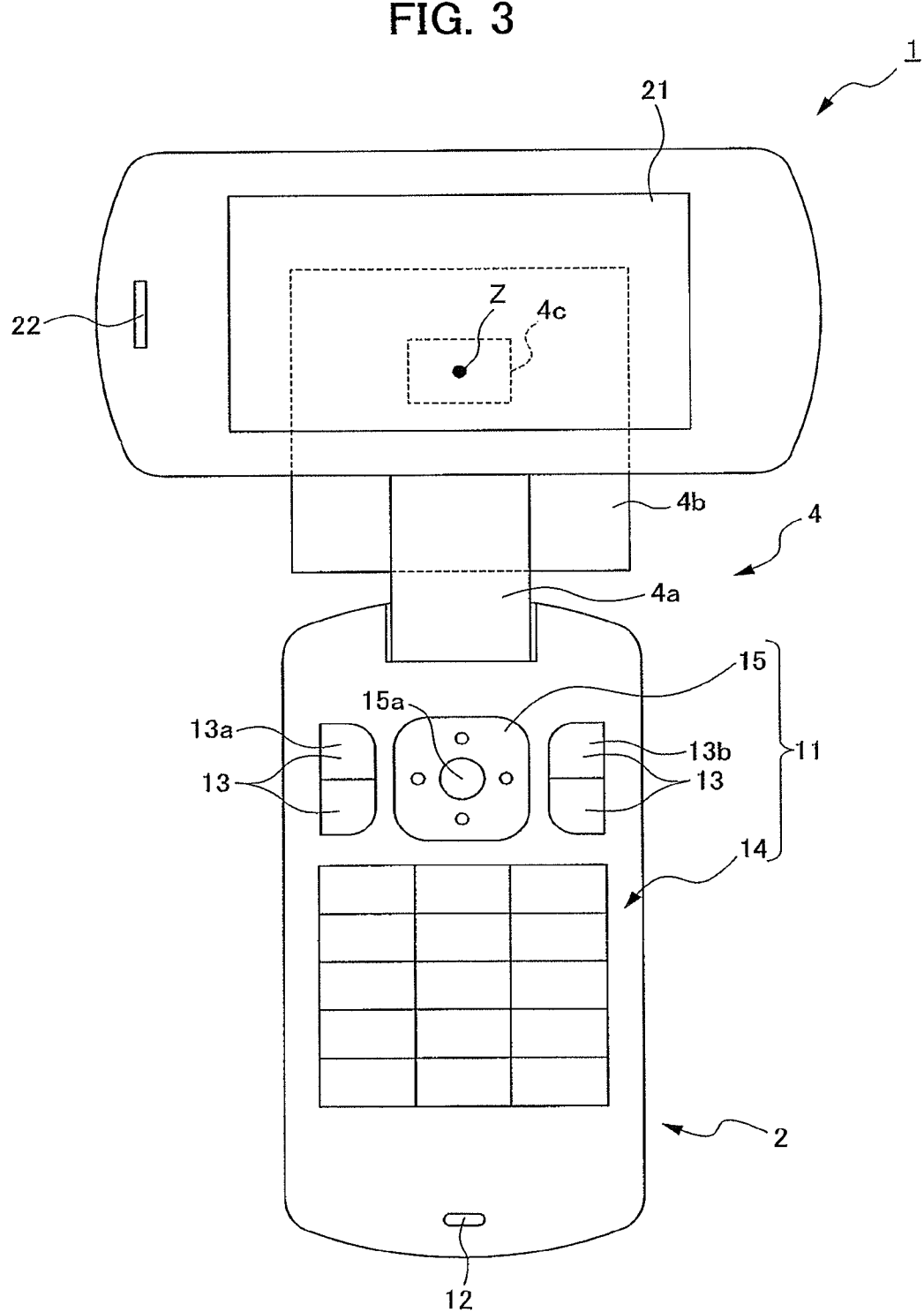
FIG. 3 is a front view of the cellular telephone device in a cross state.

Hereafter, the embodiment of the present invention will be described with reference to the drawings. Basic structures in a cellular telephone device 1 that serves as a mobile electronic device will be described with reference to FIGS. 1 to 3. FIG. 1 is a front view of the cellular telephone device 1 in an open state. FIG. 2 is a side view of the cellular telephone device 1 in an open state. FIG. 3 is a front view of the cellular telephone device 1 in a cross state.

As shown in FIGS. 1 to 3, the cellular telephone device 1 of this embodiment comprises: an operation unit side case 2 that serves as a first case; and a display, unit side case 3 that serves as a second case.

External surface of the operation unit side case 2 is constituted by a front case 2a and a rear case 2b. The operation unit side case 2 is configured so that an operation unit 11, and a microphone 12 to which voice of the user of the cellular telephone device 1 is inputted are exposed to the front case 2a side.

The operation unit 11 comprises: a function setting operation key 13 for actuating various functions such as various settings, a directory function, and an e-mail function; an input operation key 14 for inputting, for example, numeric characters of a telephone number and characters of e-mails or the like; and a determination operation key 15, that serves as an operating member, which performs operations such as determination in various operations, and scrolling in up, down, right-left directions. A predetermined function is assigned to each of the keys which constitute the operation unit 11 according to the opening and closing state of the operation unit side case 2 and the display unit side case 3, various modes, or kinds of the launched application or the like (key assigning). Moreover, by the user pressing a respective key, an action according to a function assigned to the key is executed.

The external surface of the display unit side case 3 is constituted by a front case 3a and a rear case 3b. On the front case 3a of the display unit side case 3, a display unit 21 for displaying a variety of information and a speaker 22 which outputs voice of the other party of a telephone call are arranged so as to be exposed to the outside. Here, the display unit 21 is constituted by components such as: a liquid crystal panel; a drive circuit for driving the liquid crystal panel; and a light source unit such as a back light unit, which irradiates light from the back side of the liquid crystal panel.

The operation unit side case 2 and the display unit side case 3 are connected openably and closably via a connecting part 4. Specifically, the connecting part 4 is constituted by: a hinge mechanism 4a, a supporting part 4b; and a rotation mechanism 4c.

As shown in FIG. 2, the end part of the operation unit side case 2 at the connecting part 4 side and the supporting part 4b are connected via the hinge mechanism 4a. The display unit side case 3 and the hinge mechanism 4a are connected via the supporting part 4b. The supporting part 4b and the display unit side case 3 are connected via the rotation mechanism 4c. Thereby, the cellular telephone device 1 connects the operation unit side case 2 and the display unit side case 3 via the hinge mechanism 4a, the supporting part 4b, and the rotation mechanism 4c, and is configured such that the operation unit side case 2 and the display unit side case 3 can be relatively moved and the display unit side case 3 and the supporting part 4b can be relatively moved.

That is, the cellular telephone device 1 can be in: a state where the operation unit side case 2 and the display unit side case 3 are opened and where the longitudinal direction of the operation unit side case 2 and the longitudinal direction of the display unit side case 3 are substantially identical (open state); a state where the operation unit side case 2 and the display unit side case 3 are folded together (closed state); and a state where the longitudinal direction of the display unit side case 3 and the longitudinal direction of the display unit side case 3 cross with each other forming a predetermined angle (for example, substantially 90 degrees) by rotating the display unit side case 3 against the supporting part 4b about a rotation axis Z (cross state).

Here, a closed state is a state where the operation unit side case 2 and the display unit side case 3 face and overlap with each other. An open state is a state where the operation unit side case 2 and the display unit side case 3 do not overlap with each other. A cross state is a state where a relative position of the display unit side case 3 to the supporting part 4b is changed from the open state. Thus, the connecting part 4 connects the operation unit side case 2 and the display unit side case 3 so that the state changes between the open state or the cross state, and the closed state.

In addition, detection of the open state, the closed state, and the cross state can be performed using a hall device and a magnetic part (both of which are not illustrated), for example. Specifically, the hall device and the magnetic part are spaced apart from each other in the open state and the cross state, and arranged so that the hall device and the magnetic part overlap with each other in the thickness direction of the case in the closed state. Since the distances between the hall device and the magnetic part are different among the open state, the closed state, and the cross state at this time, strength of the magnetic force lines radiating from the magnetic part to the hall device is also different. Thus, the hall device detects the open state, the closed state, and the cross state in the cellular telephone device 1 using the strength (magnitude of the magnetic force) of the magnetic force line radiated from the magnetic part.

In addition, as shown in FIG. 2, a side key 2c is formed at the side surface of the operation unit side case 2. The function of the side key 2c will be described later.

Figure 4:
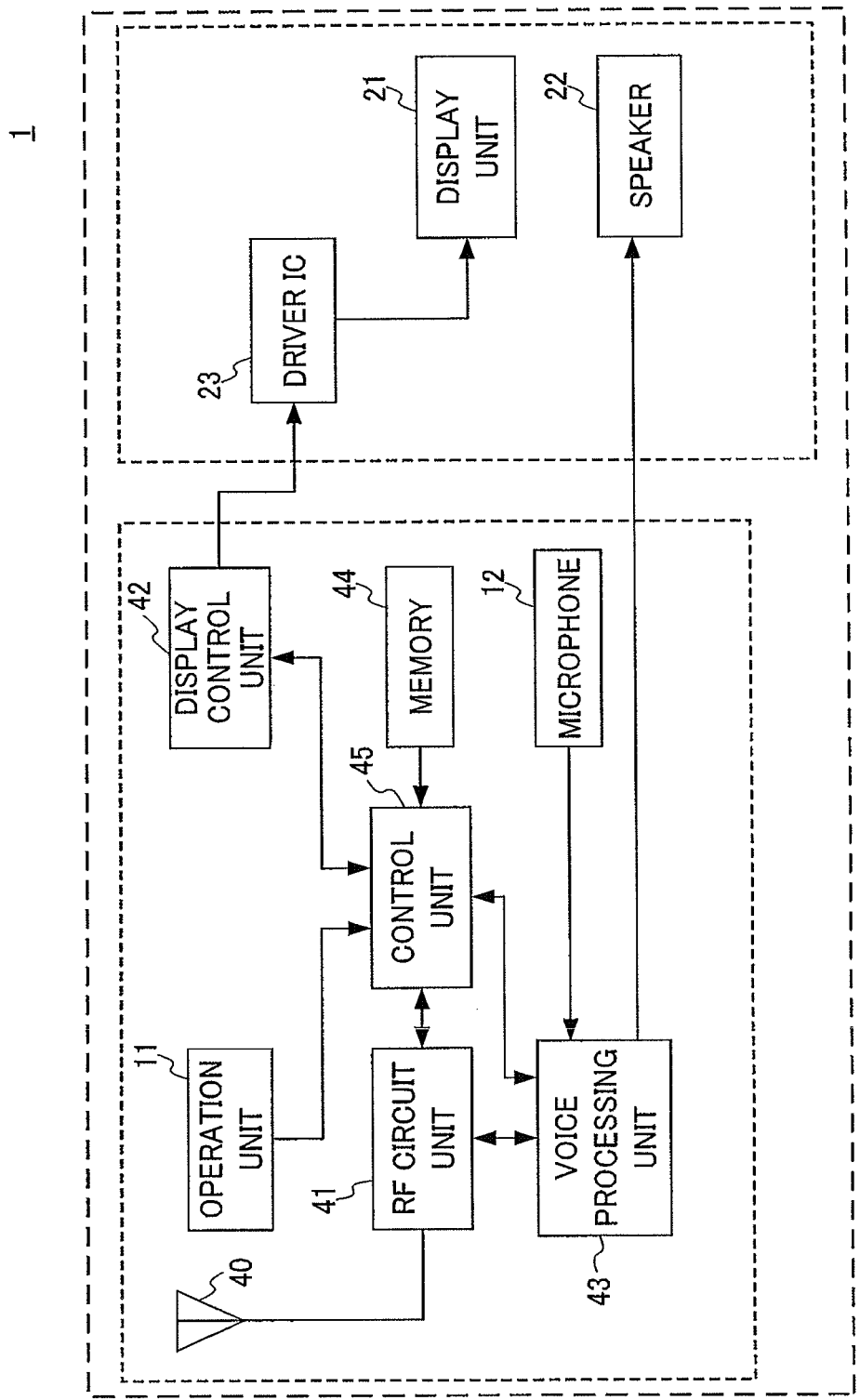
FIG. 4 is a functional block diagram showing the function of the cellular telephone device according to this embodiment.

FIG. 4 is a functional block diagram showing functions of the cellular telephone device 1. In the cellular telephone device 1, as shown in FIG. 2, the operation unit side body 2 includes the operation unit (input unit) 11, the microphone 12, a main antenna 40, an RF circuit unit 41, a display control unit 42, a sound processing unit 43, memory 44, and a control unit 45. In the cellular telephone device 1, the display unit side body 3 includes the display unit 21, the receiver 22, and a driver IC 23.

The main antenna 40 communicates with a base station or the like via a first usable frequency band (for example, 800 MHz), and is configured as a dual band compatible antenna that is compatible with a second usable frequency band (for example, 1.5 GHz) for GPS communication. It should be noted that, although 800 MHz is set as the first usable frequency band in the present embodiment, other frequency bands can also be used. Moreover, the main antenna 40 may communicate with an external device via the first usable frequency band, and another antenna compatible with the second usable frequency band for GPS communication may be separately provided.

The RF circuit unit 41 performs demodulation processing of a signal received via the main antenna 40, and transmits the processed signal to the control unit 45. The RF circuit unit 41 performs modulation processing of the signal transmitted from the control unit 45, and transmits the signal to external devices (base stations) via the main antenna 40. In addition, on the other hand, the RF circuit unit 41 notifies the control unit 45 of the intensity of a signal received via the main antenna 40.

The display control unit 42 performs predetermined image processing according to control by the control unit 45, and outputs the processed image data to the driver IC 23. When the image data is transmitted from the display control unit 42, the driver IC 23 stores the image data in frame memory, and outputs the image data on the display unit 21 at predetermined timing.

The sound processing unit 43 performs predetermined sound processing according to control by the control unit 45 on a signal transmitted from the RF circuit unit 41, and outputs the processed signal to the receiver 22 or a speaker (not shown). The receiver 22 outputs the signal that is transmitted from the sound processing unit 43, to the outside.

Furthermore, when a signal is input from the microphone 12, the sound processing unit 43 processes the signal according to control by the control unit 45, and outputs the processed signal to the RF circuit unit 41. The RF circuit unit 41 performs predetermined processing on the signal transmitted from the sound processing unit 43, and outputs the processed signal to the main antenna 40.

The memory 44 includes, for example, working memory, and is utilized for arithmetic processing by the control unit 45.

Moreover, the memory 44 stores a plurality of applications as well as a variety of tables and the like, required by the applications. In addition, the memory 44 may also serve as detachable external memory.

The control unit 45 controls the entirety of the cellular telephone device 1, and is configured to employ a central processing unit (CPU) and the like. Here, a description is provided for control operations of the control unit 45 depending on key operations via the operation unit 11. The control unit 45 changes the characters and functions to be assigned to each key (the function setting operation keys 13, the input operation keys 14 and the selection key 15) configuring the operation unit 11, essentially in accordance with an application that is currently activated.

Figure 5:
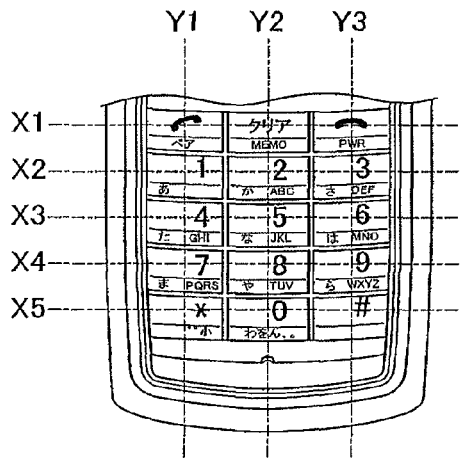
FIG. 5 is a diagram for explaining key assigning in accordance with this embodiment.

More specifically, when any key is depressed, the operation unit 11 transmits position information of the key to the control unit 45 (for example, as shown in FIG. 5(*a*), in a case of depressing a key in the second line and the left row among the input operation keys 14 (a key with "1" and "a" printed on its surface, position information of (X2, Y2) is transmitted). The control unit 45 accesses the memory 44, refers to a key assignment table corresponding to an application that is currently activated, and executes processing of a character and a function assigned thereto, based on the position information that has been transmitted from the operation unit 11. For example, as shown in FIGS. 5(*b*) to 5(*d*), the memory 44 stores a plurality of key assignment tables. It should be noted that FIG. 5(*b*) is a table that is utilized when an outgoing telephone call is made; FIG. 5(*c*) is a table that is utilized in a memo pad application and a mail application; and FIG. 5(*d*) is a table that is utilized when changing a channel in a television tuner application.

It should be noted that execution of processing of a character means that, for example, in a case in which the currently activated application is a memo pad application, "1" or "a" is displayed on the display unit 21. Furthermore, execution of processing of a function means that, for example, in a case in which the currently activated application is a television tuner application, the display channel is set to channel 1.

Moreover, the memory 44 stores a plurality of key assignment tables. Depending on the application, the control unit 45 switches a key assignment table to be referred to, refers to a predetermined key assignment table based on position information of a key that has been transmitted from the operation unit 11, and performs predetermined processing.

In a cellular telephone device 1 configured as such, there is Application Y, wherein when a key is operated in a communication standby state, each of a plurality of codes (for example, a numeric character and a character) assigned to the operated key are displayed on, for example, separate screen areas, in parallel, and when a predetermined key operation is performed, a screen where one of the codes is displayed is enabled. In addition, Application Y may display one code (for example, character) among the plurality of codes assigned to the operated key when a key is operated in a communication standby state.

In addition, in the cellular telephone device 1, Application Y has a function to display conversion candidates for the character string inputted with the operation unit 11, or prediction candidates that follow the character string. Furthermore, Application Y has a function to execute an application when a character string indicating a name of the application or processing contents of the application is inputted as a result of the conversion candidate or prediction candidate being selected.

Figure 6:
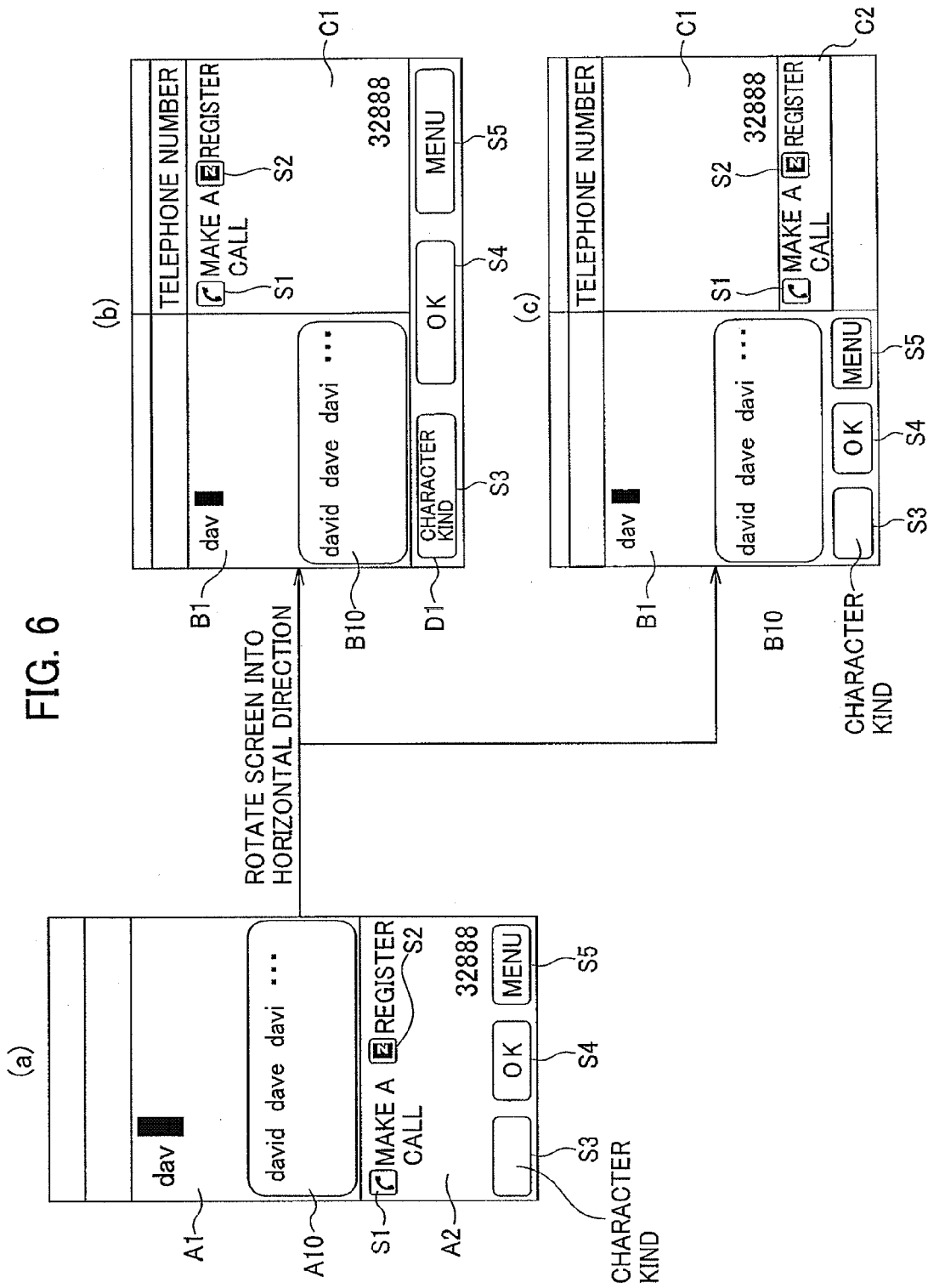
FIG. 6 is a first diagram showing an example of screen transfers displayed on the display unit according to this embodiment.
Figure 7:
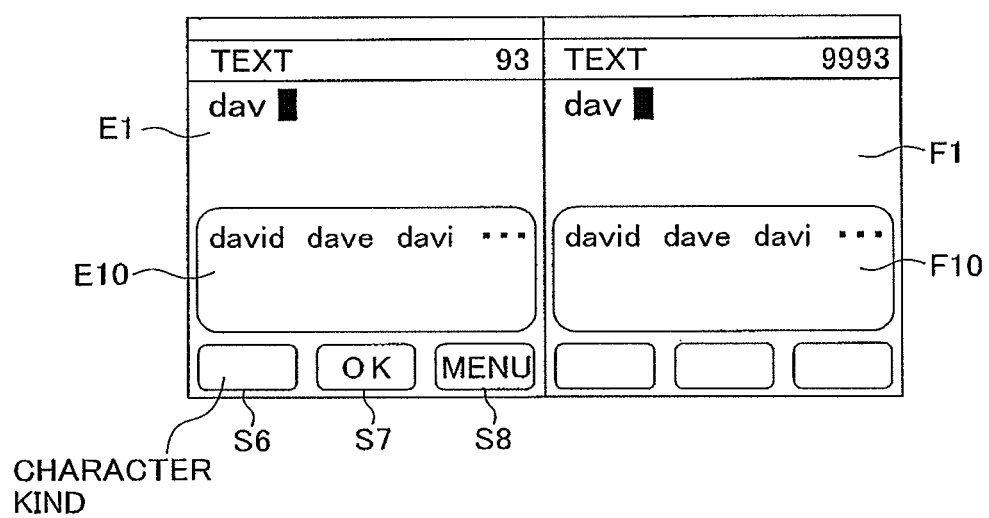
FIG. 7 is a second diagram showing an example of screen transfers displayed on the display unit according to this embodiment.

Next, processing by the control unit 45 according to this embodiment will be described with reference to FIG. 6 and FIG. 7. FIG. 6 and FIG. 7 are diagrams showing examples of screen transfers displayed on the display unit 21 according to this embodiment.

When one operation key is operated among the plurality of operation keys of the operation unit 11 in a state where the display screen of the display unit 21 is used vertically (open state; refer to FIG. 1), the control unit 45 according to this embodiment splits the display screen into upper and lower sides by Application Y. Then, the control unit 45 displays the first character kind character assigned to one operation key on the one side, and displays the second character kind character assigned to the same operation key on the other side.

Specifically, as shown in FIG. 6(a), when the operation key is operated in a state where the display screen of the display unit 21 is used vertically, the control unit 45 launches Application Y. Moreover, the control unit 45 splits the display screen into upper and lower sides with Application Y, and displays alphabetic characters ("dav" in this example) assigned to the operation key thus operated in a region A1 in the display screen, and displays a numeric characters ("32888" in this example) assigned to the same operated operation key in a region A2 in the display screen.

In addition, the control unit 45 displays a region A10 for displaying conversion candidates of the alphabetic character string displayed in the region A1 in the display screen with Application Y. In addition, the control unit 45 displays with Application Y a plurality of keys S1 and S2, which are related to functions that use the numeric character string displayed in the region A2 in the display screen. Here, key S1 is a key for making a telephone call using the numeric character string displayed in the region A2 by a telephone call making application. Key S2 is a key for registering into the directory (phonebook) the numeric character string displayed in the region A2 by the directory application.

In addition, the control unit 45 displays in the region A2 in the display screen with Application Y: a soft key S3 for changing the character kind of the character displayed in the region A1 in the display screen; a soft key S4 for confirming various operations to the character string displayed in the region A1 in the display screen; and a soft key S5 for displaying various functions that can be applied to the character string displayed in the region A1 in the display screen. In addition, the keys 13a, 15a, and 13b correspond to soft keys S3, S4 and S5, respectively. A function corresponding to the display of a respective soft key is executed at the time when the key is pressed down.

Each of soft keys S3, S4 and S5 is associated with an operation key of the operation unit 11. For example, soft keys S3 and S5 are associated with the function setting operation keys 13a and 13b among the function setting operation keys 13 in the operation unit 11, and soft key S4 is associated with the determination operation key 15a in the operation unit 11. Moreover, when the function setting operation keys 13a and 13b or the determination operation key 15a is pressed, functions corresponding to the display of respective soft keys S3 and S5 are executed. In addition, when the determination operation key 15a is pressed down, the operation executed immediately before is confirmed. It should be noted that key S1 is a key shown at (X1, Y1) in FIG. 5, for example. Key S2 is one of the function setting operation keys 13 in FIGS. 1 and 3 (for example, a key located in the lower right among the four function setting operation keys 13), for example. In addition, a soft key is a key for assigning a function that changes as needed and is displayed in a region imitating a button.

From such a state in which the display screen of the display unit 21 is used vertically as shown in FIG. 6(a), the display unit side case 3 is rotated against the supporting part 4b about the rotation axis Z so as to transfer the state to a cross state, that is, a state in which the display screen of the display unit 21 is used horizontally (refer to FIG. 3). In the state in which the display screen is used horizontally, the control unit 45 splits the display screen into right and left sides as shown in FIG. 6(b). Then, the control unit 45 displays the alphabetic characters, "dav", in a region B1 on the left side, and displays the numeric characters "32888" in a region C1 on the right side with Application Y.

In addition, the control unit 45 displays a region B10, which is for displaying the conversion candidate of the alphabetic character displayed in the region B1 in the display screen. In addition, the control unit 45 displays keys S1 and S2 related to the function that uses the numeric characters displayed in the region C1 in the display screen, with Application Y.

In addition, when the region B1 in the display screen is in an enabled state, the control unit 45 displays soft keys S3, S4 and S5. Soft keys S3, S4 and S5 are displayed in a region D1 in a lower part in the display screen, wherein the width of a region D1 extends to the width of the left and right regions B1 and C1. Soft keys S3, S4 and S5 relate to functions using the characters displayed in the region B1 in the display screen. When the region C1 in the display screen is in an enabled state, the control unit 45 displays in the region D1 soft keys related to functions that use the characters displayed in the region C1. That is, the control unit 45 displays the corresponding soft keys S3, S4 and S5 on the side in which the state is an enabled state extending along a right-left direction of the display screen by arranging them uniformly, with Application Y.

In addition, in a state where the region B1 in the display screen is in an enabled state, the control unit 45 displays in the region D1 in the display screen soft keys S3, S4 and S5 corresponding to the input character string in the region B1. However, when keys S1, S2 corresponding to the input character string in the region C1 are operated, the control unit 45 switches the side of the region C1 to an enabled state. Furthermore, the control unit 45 ends (deletes) the display in the region B1 and expands the display in the region C1 to extend to the deleted region. In addition, when any one of soft keys S3, S4 and S5 is operated, the display in the region C1 side is ended (deleted), and the display in the region B1 is expanded to extend to the deleted region. Even in such a case in which the display in one of the regions has just ended, when there is an operation to cancel the input (e.g., cancellation of key operation and deletion of the last inputted character), the control unit 45 may return the state again to a state in which both the region B1 and region C1 in the display screen are displayed.

Here, instead of the illustration in FIG. 6(b), the control unit 45 may display keys S1, S2, and soft keys S3-S5, as shown in FIG. 6(c).

That is, as shown in FIG. 6(c), in a state where the display screen is used horizontally, the control unit 45 displays soft keys S3, S4 and S5 with Application Y by arranging them uniformly in a right-left direction in the region B1 in the display screen, and displays keys S1 and S2 by arranging them uniformly in a right-left direction in the region C1 in the display screen.

In addition, in response to pressing down of the side key 2c described above, the control unit 45 may switch either region B1 or C1 in the display screen to an enabled state in which the operation with soft keys S3, S4 and S5 is enabled. For example, when the side key 2c is pressed in a state where the region B1 in the display screen is in an enabled state and the region C1 is in a disabled state, the control unit 45 switches the region C1 in the display screen to an enabled state and switches the region B1 to a disabled state.

In addition, the control unit 45 may display the soft keys by arranging them uniformly in the side of only either one of the region B1 and C1 in the display screen where the state is switched to an enabled state with the side key 2c, with Application Y.

Specifically, as shown in FIG. 7, in the state in which the display screen is used horizontally, when the input operation key 14 is operated, the control unit 45 displays a character corresponding to the operated key in both the region E1 and region F1 in the operation key display screen. At this time, the control unit 45 displays soft keys S6-S8, which have similar functions to the soft keys shown in FIG. 6, by arranging them uniformly in the region E1 in the display screen, where the state is switched to an enabled state with the side key 2c, with Application Y. Furthermore, the control unit 45 performs control so as not to display a soft key in the region F1 in the display screen where the state is switched to a disabled state with the side key 2c. Here, in FIG. 7, the region E1 in the display screen corresponds to an application for SMS (Short Message Service). The region F1 in the display screen corresponds to an application for electronic mails. When either one of the soft keys is operated, the display in the disabled region F1 is ended (deleted), while continuing the display in the region E1 at the side where the state is an enabled state. After ending the display in the region F1 in this way, the control unit 45 expands the display in the region E1 to the side of the region F1 and enables the use of the region. However, at the time immediately after ending the display in the region F1, when there is an operation to cancel the input (cancellation of a soft key operation or deletion of the last inputted character), the control unit 45 returns the state again to the state in which the character is displayed on both the region E1 and region F1 in the operation key display screen.

Figure 8:
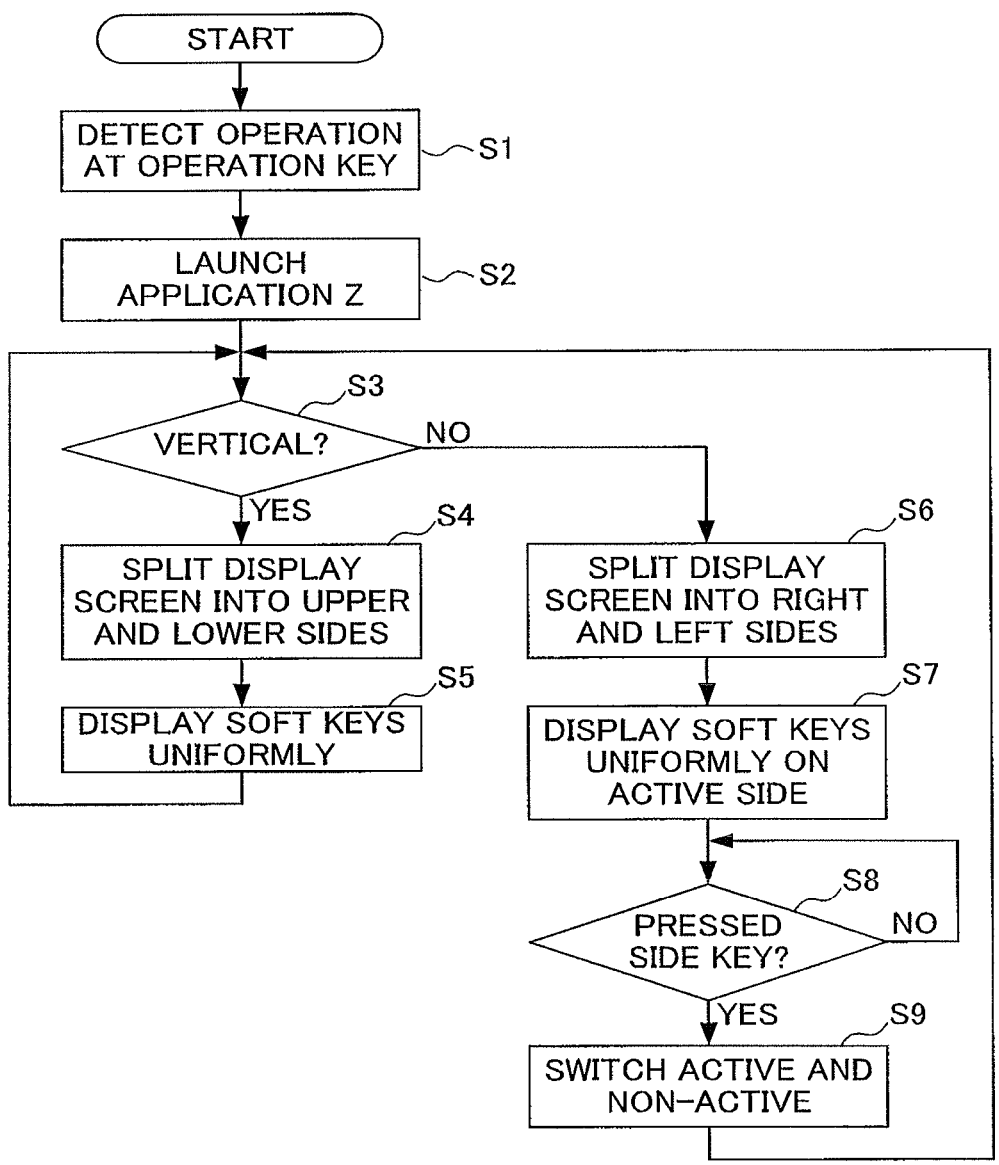
FIG. 8 is a flow chart showing internal processing of the control unit according to this embodiment.

FIG. 8 is a flow chart showing internal processing of the control unit 45 according to this embodiment. In Step S1, the control unit 45 detects that one operation key is operated among a plurality of operation keys of the operation unit 11 in the standby screen. It should be noted that a standby screen is also referred to as a wallpaper, and is a screen for the time when awaiting making and reception of a call and launching of an application. In Step S2, the control unit 45 launches Application Y described above.

In Step S3, the control unit 45 determines whether or not the cellular telephone device 1 is in an open state or a cross state, that is, the control unit 45 determines whether the display screen of the display unit 21 is in a state where the display screen is used vertically or horizontally. If it is used vertically (YES), the process proceeds to Step S4. If it is used horizontally (NO), the process proceeds to Step S6.

In Step S4, the control unit 45 displays the display screen of the display unit 21 by splitting the display screen into upper and lower sides with Application Y. In Step S5, the control unit 45 displays a plurality of soft keys by arranging them uniformly in a right-left direction of the display screen, with Application Y. Then, the process returns to Step S3 again.

In Step S6, the control unit 45 displays the display screen of the display unit 21 by dividing the display screen into right and left sides, with Application Y.

In Step S7, the control unit 45 displays the plurality of soft keys by arranging them uniformly in a right-left direction of one side of the display screen (the side that is in an enabled state) that is split into right and left sides, with Application Y.

In Step S8, the control unit 45 determines whether or not the side key is pressed. When the side key is pressed (YES), the process proceeds to Step S9. When the side key is not pressed (NO), processing in Step S8 is repeated again.

In Step S9, the control unit 45 makes the side that is in an enabled state in the display screen in Step S7 a disabled state, and makes the side that is in a disabled state in the display screen an enabled state. Then, the process returns to Step S3 again. That is, soft keys S6-S8 (refer to FIG. 7) are displayed to correspond with the function at the side switched to an enabled state in the right and left split display in the display screen.

It should be noted that, in FIG. 7, when any one of the soft keys S6-S8 is operated in a state of the right and left split display in the display screen, the control unit 45 ends (deletes) the display in the region F1, where the state is a disabled state, while continuing the display in the region E1, where the state is an enabled state. After ending the display in one of the regions in this way, the control unit 45 expands the display of the side continuing the display to the ended region. In addition, at the time immediately after ending the display in the region F1, where the state is a disabled state, when there is an operation to cancel the input (e.g., cancellation of a soft key operation, and deletion of the last inputted character), the control unit 45 makes the operation key display screen return again to the state where the character is displayed in both the region E1 and region F1.

As described above, in accordance with this embodiment, in a state where the display screen is used vertically, the control unit 45 splits the display screen into upper and lower sides, and displays the plurality of soft keys by arranging them on the display screen in a right-left direction. Moreover, the control unit 45 splits the display screen into right and left sides in a state where the display screen is used horizontally. The control unit 45 displays the first character kind character on one side and displays the second character kind character on the other side, and displays a plurality of soft keys by arranging them on either the one side or the other side in a right-left direction. Accordingly, even in a state where the display screen of the display unit 21 is used vertically, it becomes clear on the cellular telephone device 1 whether the soft key corresponds to the display screen where the first character kind character (for example, alphabetic character) is displayed or where the second character kind character (for example, numeric character) is displayed. Therefore, the operability for the user improves.

In addition, the control unit 45 displays a plurality of soft keys by arranging them in a right-left direction in the other side where the second character kind character is displayed among the locations in the display screen. Here, a plurality of soft keys relate to functions that use the second character kind character. Thereby, the cellular telephone device 1 can launch the function that uses the second character kind character by appropriately selecting it. In addition, when the second character kind is a numeric character, the cellular telephone device 1 can launch a function that uses the numeric character (for example, a telephone call making application, a directory application, and a calculator application) by appropriately selecting it.

In addition, the operation unit 11 includes a side key 2c for switching either one side or the other side of the display screen into an enabled state where an operation by the plurality of soft keys is enabled, in a state where the display screen is used horizontally. Thereby, with a simple operation, the cellular telephone device 1 can switch the display screen where the first character kind or the second character kind is displayed.

In addition, the control unit 45 displays a plurality of soft keys by arranging them uniformly, on one side or the other side of the display screen, which is switched to an active state by the side key 2c. Thereby, the cellular telephone device 1 can launch a function corresponding to the soft key displayed on the switched display screen by appropriately selecting the function.

In addition, the cellular telephone device 1 includes a connecting part 4 which connects the operation unit side case 2 and the display unit side case 3, and can transfer the display screen into a state where the display screen is used vertically or horizontally. Thereby, the cellular telephone device 1 can switch between the state used vertically and the state used horizontally as appropriate.

It should be noted that, although the above-described embodiment is shown using an example that distinguishes the state where the display screen is used vertically or the state where the display screen is used horizontally by detecting a change in the relative position of the display unit side case 3 against the supporting part 4b by using a hall device, a magnetic part, or the like, the present invention is not limited thereto. For example, in a case of a straight type terminal having a single non-connected case and a touch panel, the present invention may be configured to distinguish the state where the display screen is used vertically and the state where the display screen is used horizontally by installing an additional acceleration sensor or the like in the case and detecting an inclination state of the case. It should be noted that, in this case, the operation unit may be an operation unit having a plurality of operation keys where virtual operation keys for detecting contact to the operation keys is displayed on the touch panel, instead of key switches that need physical pressing strokes.

Although, the embodiment of the present invention has been described in the above, the present invention should not be limited to the above embodiment and can be modified as appropriate. For example, a cellular telephone device 1 having a plurality of physical operation keys has been described in the above embodiment, but the present invention should not be limited to this, and may be directed to a mobile telephone which uses a touch panel in the display unit 21 and virtual keys.

In addition, although a cellular telephone device 1 that serves as a mobile electronic device has been described in the above embodiment, the present invention is applicable to other mobile electronic devices. For example, the mobile electronic device of the present invention may be a digital camera, a PHS (registered trademark; Personal Handy phone System) device, a PDA (Personal Digital Assistant), a portable navigation device, a personal computer, a notebook PC, a portable game device, or the like.

Figure 9:
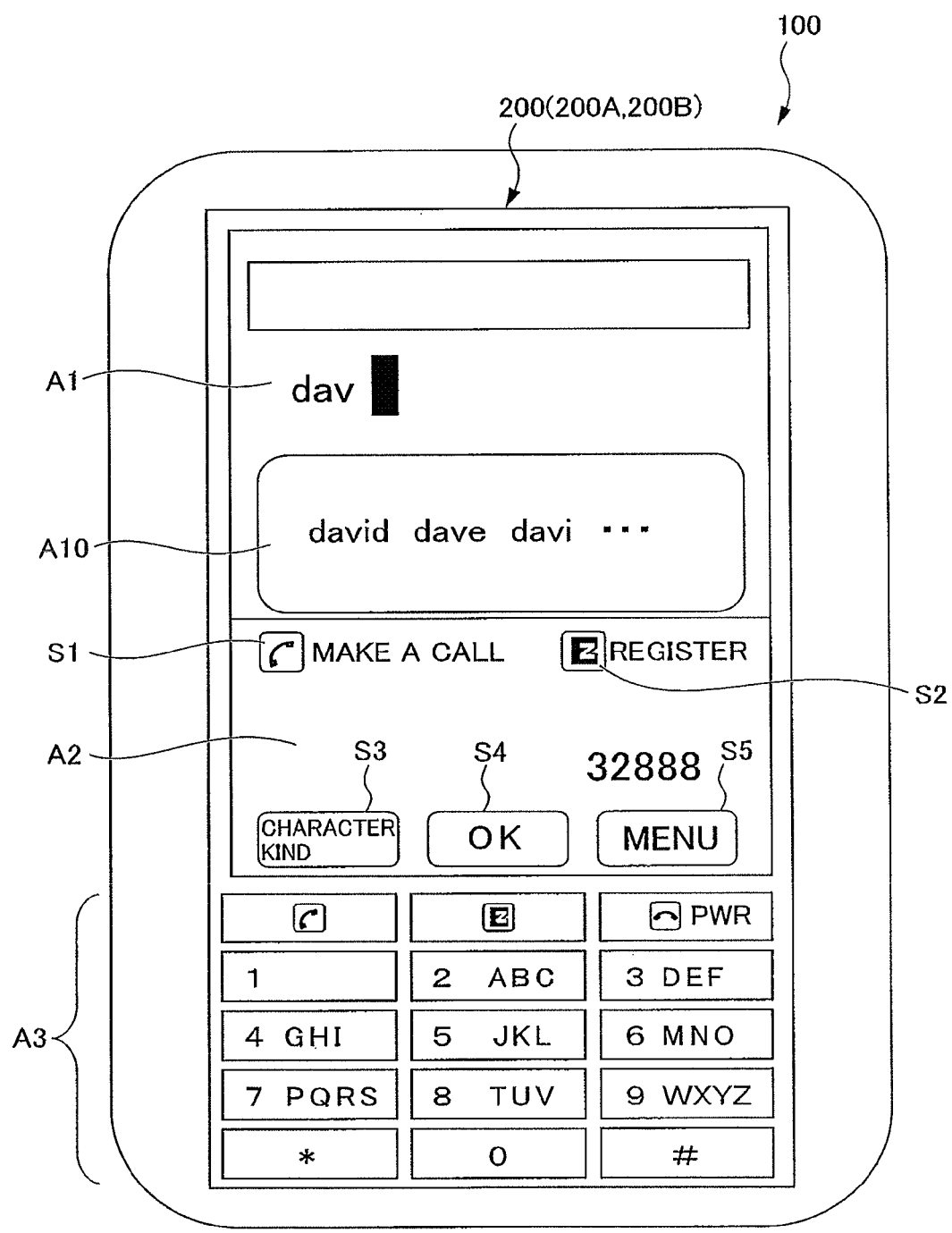
FIG. 9 is a first diagram showing an example of screen transfers displayed on the tablet device according to this embodiment.

It should be noted that the present invention can also be implemented in a tablet device 100 other than the mobile electronic device 1 including the operation unit side case 2 and the display unit side case 3. FIG. 9 is a front view of the tablet device 100 when used in a portrait mode.

The tablet device 100 includes a touch screen display 200. The touch screen display 200 has a display 200A and a touch screen 200B. The display 200A includes a display device such as an LCD (Liquid Crystal Display), an OELD (Organic Electro-Luminescence Display) or an IELD (Inorganic Electro-Luminescence Display). The display 200A displays characters, images, symbols, graphics and the like.

The touch screen 200B detects a touch of a finger, a pen, a stylus pen or the like to the touch screen 200B. The touch screen 200B detects a position where at least the finger, the pen, the stylus pen or the like touches the touch screen 200B. The touch screen 200B may use a detection method of any type such as a capacitive type, a resistive type, a surface acoustic wave type (or an ultrasonic wave type), an infrared type, an electromagnetic induction type, and a load detection type.

In a case in which the present invention is implemented in the tablet device 100, the present invention shown in FIG. 6(a) of the aforementioned embodiment is implemented as shown in FIG. 9. In other words, a configuration corresponding to the operation unit 11 in the aforementioned embodiment is displayed in Region A3 of the touch screen display 200, and the operation unit thus displayed is operated by the user.

Figure 10:
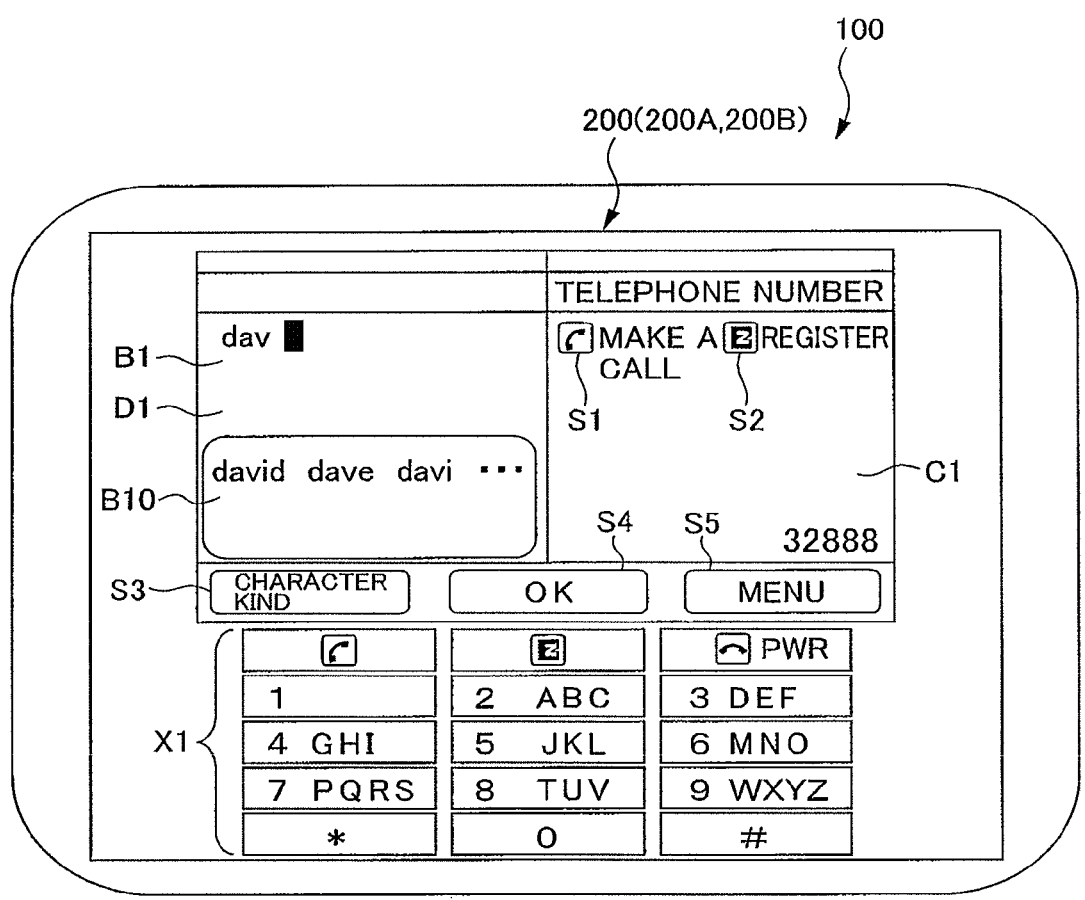
FIG. 10 is a second diagram showing an example of screen transfers displayed on the tablet device according to this embodiment.
Figure 11:
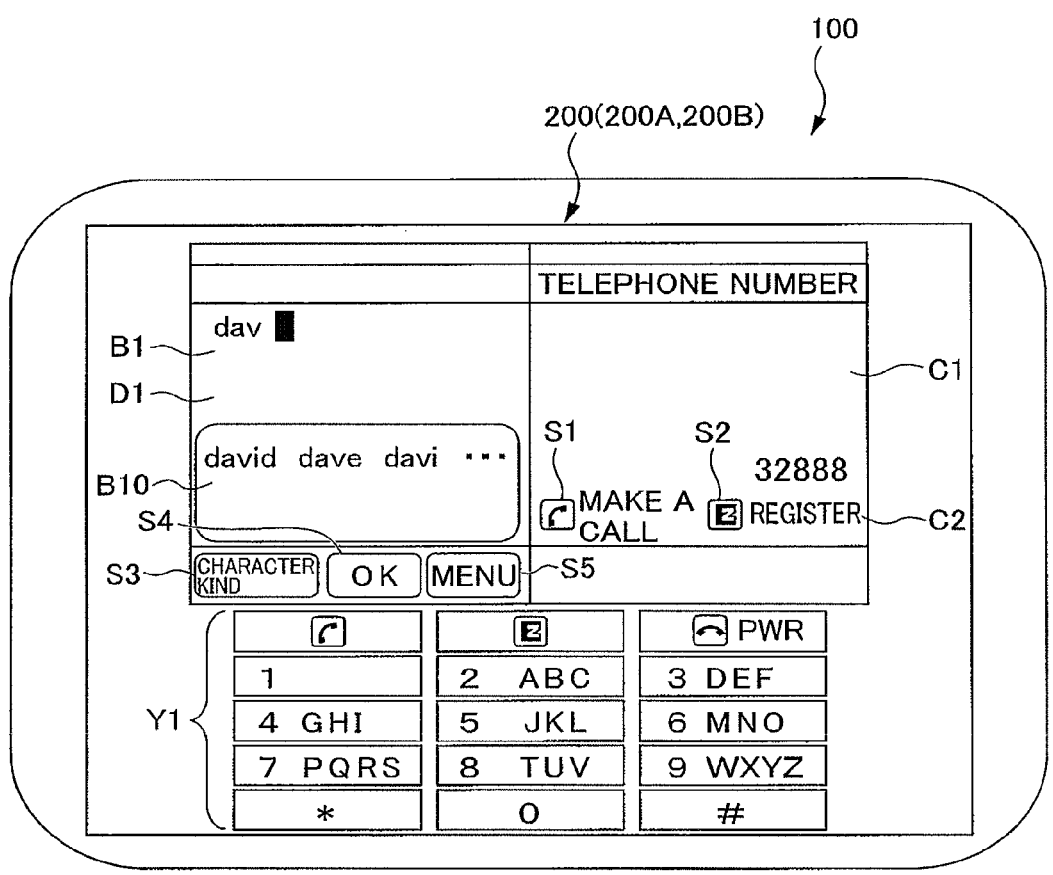
FIG. 11 is a third diagram showing an example of screen transfers displayed on the tablet device according to this embodiment.
Figure 12:
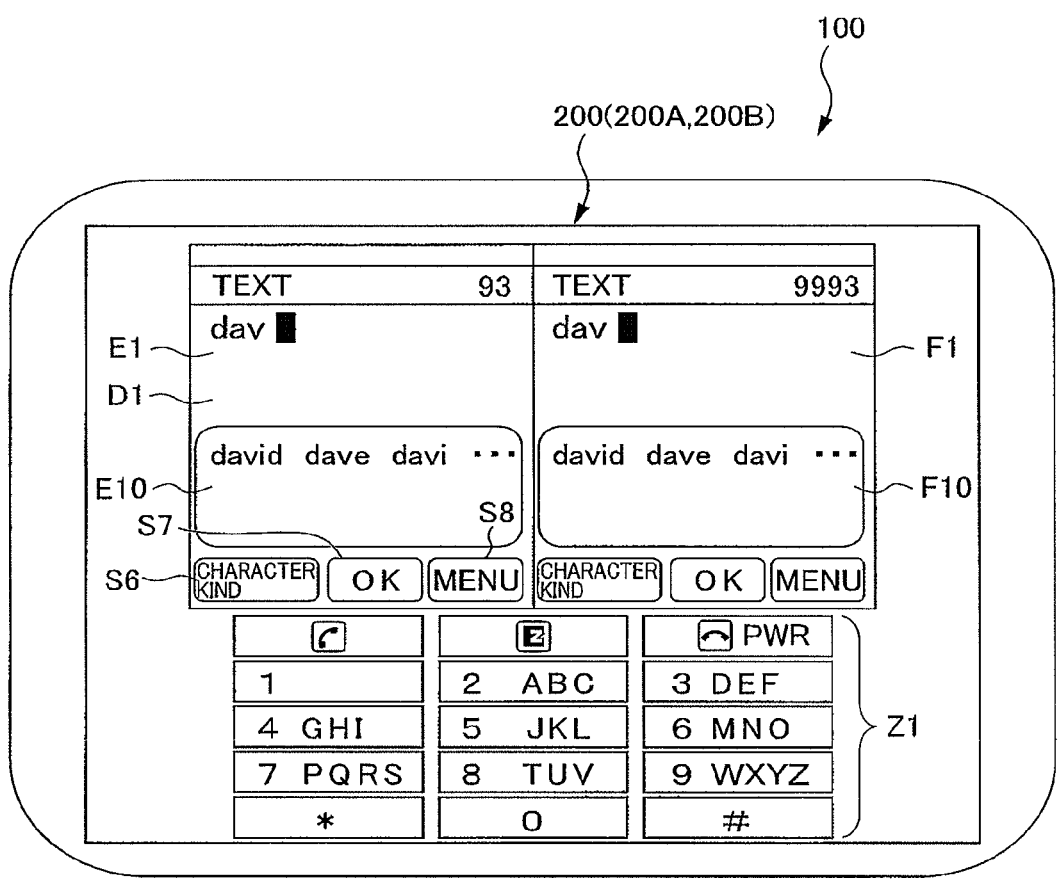
FIG. 12 is a fourth diagram showing an example of screen transfers displayed on the tablet device according to this embodiment.

Similarly, in a case in which the present invention is implemented in the tablet device 100, the present invention shown in FIG. 6(b) of the aforementioned embodiment is implemented as shown in FIG. 10. In other words, a configuration corresponding to the operation unit 11 in the aforementioned embodiment is displayed in Region X1 of the touch screen display 200, and the operation unit thus displayed is operated by the user. Similarly, in a case in which the present invention is implemented in the tablet device 100, the present invention shown in FIG. 6(c) of the aforementioned embodiment is implemented as shown in FIG. 11. In other words, a configuration corresponding to the operation unit 11 in the aforementioned embodiment is displayed in Region Y1 of the touch screen display 200, and the operation unit thus displayed is operated by the user. Similarly, in a case in which the present invention is implemented in the tablet device 100, the present invention shown in FIG. 7 of the aforementioned embodiment is implemented as shown in FIG. 12. In other words, a configuration corresponding to the operation unit 11 in the aforementioned embodiment is displayed in Region Z1 of the touch screen display 200, and the operation unit thus displayed is operated by the user.

What is claimed is:

1. A rotatable mobile electronic device, comprising:
  a display having a display screen;
  an operation unit having a plurality of operation keys to which at least a first character kind character and a second character kind character are assigned, said plurality of operation keys including a function settings operation key, an input operation key, or a determination operation key; and
  a controller,
  wherein when one operation key is operated among the plurality of the operation keys, said controller is configured to display on the display screen the first character kind character and the second character kind character assigned to the operation key thus operated,
  wherein
  when said one operation key is operated among the plurality of the operation keys in a portrait state of the display screen, the controller is configured to
    split the display screen into upper and lower sides, and
    display on the display screen a plurality of soft keys in a right-to-left direction,
  when said one operation key is operated among the plurality of the operation keys in a landscape state of the display screen, the controller is configured to
    split the display screen into right and left sides,
    automatically display a first character kind character on a first side of the right and left sides of the display screen,
    automatically display a second character kind character on a second side of the right and left sides of the display screen,
    display the plurality of soft keys on the first side or the second side of the display screen in the right-to-left direction, and display the plurality of operation keys over the first side to the second side of the display screen,
the first character kind character or the second character kind character is a numeric character, and
another first character kind character or second character kind character is an alphabetic character.

2. The mobile electronic device according to claim 1, wherein the controller is configured to display in the right-to-left direction the plurality of soft keys that relate to a function that uses the second character kind character, on the second side of the display screen where the second character kind character is displayed.

3. The mobile electronic device according to claim 2, wherein,
in a state where (i) the first character kind character is displayed on the first side of the display screen, (ii) the second character kind character is displayed on the second side of the display screen, and (iii) the plurality of soft keys that relate to a function that uses the second character kind character is displayed on the second side of the display screen, the controller is configured to delete the display of the first character kind character from the first side of the display screen when any one of the plurality of soft keys is operated.

4. The mobile electronic device according to claim 1, wherein the operation unit includes a switching key for switching, in the landscape state of the display screen, either the first side or the second side of the display screen to an enabled state where an operation by the plurality of soft keys is enabled.

5. The mobile electronic device according to claim 4, wherein the controller is configured to display the plurality of soft keys on the first side or the second side of the display screen that is switched to the enabled state, which is active, by the switching key, uniformly in the right-to-left direction.

6. The mobile electronic device of claim 4, wherein, when any one of the plurality of soft keys is operated, the controller is configured to expand one of the first side or the second side which is enabled into the other of the first side or the second side which is disabled in the display screen.

7. The mobile electronic device of claim 6, wherein, when the operation by any one of the plurality of soft keys is canceled, the controller is configured to cause the display screen to return to a state where one of the first side or the second side is enabled and the other of the first side or the second side is disabled.

8. The mobile electronic device according to claim 1, further comprising:
a first case having the display;
a second case having the operation unit; and
a connecting part which connects the first case and the second case and is configured to transfer the display screen between the portrait state and the landscape state.

9. The mobile electronic device according to claim 1, further comprising:
a case having a touch panel having the display and the operation unit,
wherein the controller is configured to distinguish whether the display screen is in the portrait state or in the landscape state, by detecting an inclination state of the case.

10. A rotatable mobile electronic device, comprising:
a display having a display screen;
an operation unit having a plurality of operation keys where at least a first character kind character and a second character kind character are assigned, said operation keys including a function settings operation key, an input operation key, or a determination operation key; and
a controller configured to display on the display screen, when one operation key is operated among the plurality of operation keys, the first character kind character and the second character kind character assigned to the operation key thus operated;
wherein,
when one operation key is operated among the plurality of the operation keys in a portrait state of the display screen, the controller is configured to split the display screen into upper and lower sides and display a plurality of soft keys on the display screen uniformly in a right-to-left direction, and
when one operation key is operated among the plurality of the operation keys in a landscape state of the display screen, the controller is configured to
split the display screen into right and left sides,
automatically display the first character kind character on a first side of the right and left sides,
automatically display the second character kind character on a second side of the right and left sides,
display the plurality of soft keys in the right-to-left direction in a region extending to both the first side and the second side, and
display the plurality of operation keys over the first side to the second side of the display screen,
wherein
the first character kind character or the second character kind character is a numeric character, and
another first character kind character or second character kind character is an alphabetic character.

11. A soft key input method in a mobile electronic device having a display and an operation unit, the method comprising:
displaying, when one operation key is operated among a plurality of operation keys of the operation unit, a first character kind character and a second character kind character assigned to the operation key thus operated on a display screen of the display, wherein said operation keys include a function settings operation key, an input operation key, or a determination operation key;
when said one operation key is operated among the plurality of the operation keys,
displaying, in a portrait state of the display screen, a plurality of soft keys on the display screen in a right-to-left direction by splitting the display screen into upper and lower sides; and
automatically displaying, in a landscape state of the display screen, the first character kind character on a first side of right and left sides and the second character kind character on a second side of right and left sides, and
displaying, in the landscape state of the display screen, the plurality of soft keys on the first side or the second side in the right-to-left direction and the plurality of operation keys over the first side to the second side of the display screen by splitting the display screen into right and left sides,
wherein
the first character kind character or the second character kind character is a numeric character, and
another first character kind character or second character kind character is an alphabetic character.

12. A rotatable mobile electronic device, comprising:
a display having a display screen;
an operation unit having a plurality of operation keys to which at least a first character kind character and a second character kind character are assigned, said operation keys including a function settings operation key, an input operation key, or a determination operation key; and
a controller which is configured to, when one operation key is operated among the plurality of the operation keys, display on the display screen the first character kind character and the second character kind character assigned to the operation key thus operated,
wherein,
when said one operation key is operated among the plurality of the operation keys in a portrait state of the display screen, the controller is configured to display on the display screen a plurality of soft keys in a right-to-left direction, and
when said one operation key is operated among the plurality of the operation keys in a landscape state of the display screen, the controller is configured to
split the display screen into right and left sides,
automatically display a first character kind character on a first side of the right and left sides,
automatically display a second character kind character on a second side of the right and left sides,
display the plurality of soft keys on the first side or the second side of the display screen in the right-to-left direction, and
display the plurality of operation keys over the first side to the second side of the display screen,
wherein
the first character kind character or the second character kind character is a numeric character, and
another first character kind character or second character kind character is an alphabetic character.

* * * * *